F. TWYMAN AND H. WORKMAN.
OPTICAL APPLIANCE FOR TWO-COLOR HELIOCHROMY.
APPLICATION FILED NOV. 21, 1916.
1,304,517.  Patented May 20, 1919.
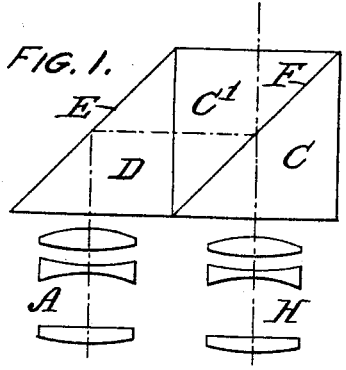
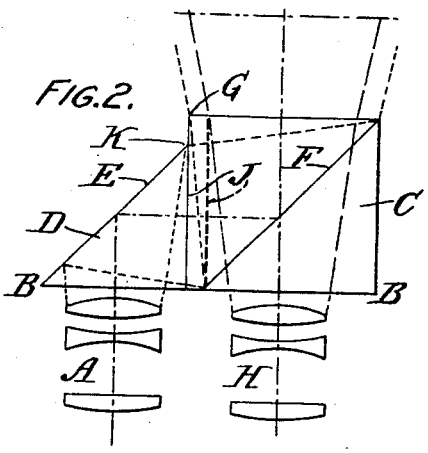
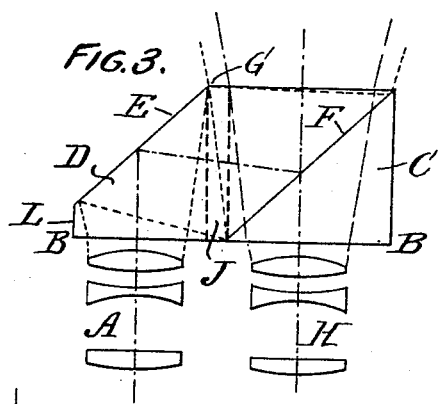
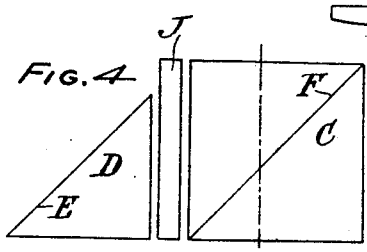
Inventors
F. TWYMAN & H. WORKMAN
per H C Heide
Attorney

UNITED STATES PATENT OFFICE.

FRANK TWYMAN, OF LONDON, ENGLAND, AND HAROLD WORKMAN, OF GLASGOW, SCOTLAND.

OPTICAL APPLIANCE FOR TWO-COLOR HELIOCHROMY.

1,304,517. Specification of Letters Patent. Patented May 20, 1919.

Application filed November 21, 1916. Serial No. 132,589.

*To all whom it may concern:*

Be it known that we, FRANK TWYMAN and HAROLD WORKMAN, subjects of His Majesty King George V, of the United Kingdom of Great Britain and Ireland and of the British Dominions beyond the Sea and Emperor of India, residing respectively, at London, England, and Glasgow, Scotland, have invented certain new and useful Improvements in Optical Appliances for Two-Color Heliochromy, of which the following is a specification.

The present invention relates to cameras, and more especially cinematograph cameras, in which a branch is separated from the entering beam of light, by reflection in a partially transmitting and partially reflecting compound prism block (hereinafter called "compound prism block"), the direct beam passing through one objective (hereinafter called "direct lens"), while the branch beam reflected in the block is again reflected by a reflecting prism (hereinafter called "reflecting prism") fitted at the side of the compound prism block so that the axes of the direct beam and the branch beam are brought into parallelism and the branch beam traverses a second objective (hereinafter called "side lens"). Such a device is used in association with color screens appropriate to the two color system and the herein described system produces two images in the same plane.

The present invention aims to provide new and improved forms and arrangements of a combined lens and prism system of the class hereinabove referred to whereby such a taking system is made more efficient for use in two color cameras, and in particular for use in two color cinematograph cameras.

By the present invention provision is made for securing an efficient taking system of the class described in which lenses of large aperture and of short focal length can be used at a small separation with a minimum or a considerably reduced amount of hooding or cutting off of light from the lenses in the prism system, and for securing equal size of two images for objects at a specific average distance from the camera at which it is intended to use the system, tolerable error in size of the images for objects more distant from or nearer to the camera being negligible or allowable.

To the foregoing ends the present invention comprises the provision in such a taking system of a specially constructed partially transmitting and partially reflecting compound prism block with a reflecting prism arranged at the side of it, the compound prism block being made up of two equal sided or approximately equal sided right angled prisms cemented together hypotenuse to hypotenuse, together with a flat piece of glass added to or preferably made in one piece with that rectangular prism through the face of which the light enters the system, such addition being on the side optically integral with the reflecting prism, and together with a reflecting rectangular prism added to the extended side of such a compound prism block so that its reflecting surface is exactly parallel to the partially reflecting surface formed at the junction surface of the compound prism block and so that its face by which the doubly reflected portion of the divided light leaves it is parallel to and preferably on the same plane as the back surface of the compound prism block, such totally reflecting prism being either cemented to or made in one piece with the flat piece added to the side of the front prism of the compound prism block or made in one piece with the front prism and the flat piece added to the side of it.

The partially transmitting and partially reflecting surface of the block may be made partially reflecting by the coating or deposition all over of a thin partially reflecting and partially transmitting layer of silver, platinum or other suitable metal or substance, or by the coating or deposition all over of a fully reflecting layer of silver, platinum or other suitable metal or substance, and the subsequent removal of narrow lines or small areas of such coating over the whole reflecting surface, so as to reflect and transmit the light in the desired proportions.

As exemplified in the hereinafter described forms of the block with its reflecting prism, constructions under the invention need involve no more than three pieces and in certain cases two pieces will serve.

In taking systems of the class described and also in such taking systems constructed according to the present invention, the side lens is virtually or optically situated somewhat farther from the scene than the direct lens; thus the two lenses if accurately paired will form images of unequal size, the image formed by the side lens being the smaller. This is remedied by part of the present invention, and to this end two lenses of unequal focal length are used the side lens being of greater focal length, and so much greater focal length as to give equality of image to objects at a determined distance, or a distance in reference to which an adjustment has been made, as for example, 25 feet, and this for a set or known separation between the axis of the direct lens and the axis of the side lens, one inch for example. As in practice it may be difficult to secure lenses originally constructed to the required relative focal length, known expedient for adjusting the relative focal length of the two lenses may be adopted, a universally applicable expedient being to introduce appropriate thin supplementary glasses as for example a thin supplementary negative glass to extend the focal length of the side lens or a thin supplementary positive glass to diminish the focal length of the direct lens. One advantage of this system of supplementary thin glasses is that the device may be readily adjusted or altered for true effect at various distances, especially when objects at near distances are to be photographed. Other known methods of adjusting the relative focal length of the two lenses may be adopted, as for example, by shortening or lengthening the mount or by modes indicated in the chapter "Adjusting dissimilar lenses," commencing on page 154 of Taylor's *Optics of Photography*, London, 1892. For instance adjustments may be made by separating or approaching constitutents of the lenses in accordance with known conditions and in a case of this kind a graduated milled head may control the separation. It may be remarked that ordinarily the separation required is so minute as not to appreciably effect the adjustments for flatness of field or spherical aberration; but if desired counter corrections may be applied in a way well known to opticians.

It may be remarked that there are distances beyond which photographers will tolerate errors in focusing, such distances being sometimes called by the photographer "infinities," and at other times "hyperfocal distances." In parity there are distances beyond which the errors due to paired lenses may be tolerated, and if lenses are adjusted for true effect at any great distance, the errors may be tolerated for all beyond this distance, although nearer objects may involve intolerable error. In other words the corrections above treated of most notably affect near objects. It is obvious that the error which is corrected by the present invention becomes greater as the separation of the lenses (direct lens and side lens) is increased, therefore the separation of the lenses should be as little as practicable.

As the side lens has a greater focal length than the direct lens, the side lens should be set forward in relation to the direct lens by the difference between the two back conjugate foci as gaged by or tested on an object at the distance for which the device is adjusted for true effect, this distance being conveniently determined by trial.

Apart from the above defined optical conditions for true effect in the matter of focal length and magnitude as bearing on any given or required distance from the camera, this invention as hereinbefore stated includes forms and arrangements of the prism system by which the combined lens and prism system is rendered more efficient.

These forms and arrangements will be best explained by assuming and illustrating cases in which there is most need of good working conditions; these being especially cases in which lenses of short focal length and comparatively large aperture are used.

In the drawings Figure 1 is a diagram illustrating a combined lens and prism system of the class described, but according to one part of the present invention this is to be considered as modified in the sense of the side lens having a greater focal length as hereinabove defined.

Fig. 2 is a diagram illustrating a combined lens and prism system of the class described in which improvements according to the present invention have been embodied.

Fig. 3 is a similar diagram to Fig. 2 illustrating a modification, and

Fig. 4 shows the three parts of the prism system separated, to wit, (1) compound prism block, (2) flat glass extension or ajutage, and (3) the reflecting prism.

As an example the desired result may be obtained with two objectives (direct lens and side lens) the focal lengths of which are slightly different and are about $2\frac{1}{4}$ inches and of f/3.5 aperture, set with a separation of the axles of $1\frac{3}{16}$th inches for forming two pictures of one inch wide and $\frac{3}{4}$ inch high, side by side on one film; the block and reflecting prism being made of a clear permanent glass of high refractive index, as flint glass of 1.65 refractive index.

In Fig. 1 the compound prism block is of the class described being composed of two rectangular prisms C C$^1$ cemented hypotenuse to hypotenuse placed directly in front of the direct lens H, the cemented surface being made partially transmitting and partially reflecting as described and having a similar right angled reflecting prism D cemented to the side of it, these prisms being of such a size that the axes produced of the two lenses A and H pass through the centers of the back faces of the two prisms D and C.

As hereinabove stated the side lens A has a slightly longer focal length than the direct lens H and is set slightly forward closer to the prism.

In Fig. 2 the compound prism block together with the reflecting prism are shown of the improved form comprised in the present invention.

In order to make a first approximation in plotting out such a system on paper the following procedure may be adopted. Let A Fig. 2 represent the side lens. As near as convenient to the outer surface of the front glass of A is drawn a line B B at right angles to the axis of A. This line B B indicating the position of the inner face of the compound prism block C and reflecting prism D. The positions of the two parallel reflecting surfaces E and F at or about 45° to the axial ray and the front face of the prism block through which the light enters the system are found by trial and error. An outer marginal ray assumed for the purpose of construction to leave A should be so reflected from E as to reach F at the point where F meets the line B B, and this ray is reflected from F so as to reach the forward angle of the extension of the compound prism block marked G. The inner marginal ray which for the purpose of construction may be regarded as coming from the side lens A meets the reflecting surface E at the junction of the reflecting prism with the extension of the compound prism block at the position indicated by K.

The axis of the doubly reflected beam extended backwise through the prism block forms the axis of the lens H which forms the directly transmitted image.

Reference to this figure will show how the construction is accommodated to the conicity of the beam from the scene by decentering the effective or reflection-transmission surface of the compound prism block C in relation to the direct lens H in a direction away from the axis of the side lens A, and by providing a plain glass extension of or ajutage J to the block C, into which extension or ajutage J the surface F does not intrude, toward the side lens A. The three parts, to wit, (1) the compound prism block C, (2) the plain glass extension or ajutage J, and (3) the reflecting prism D are depicted as separated in Fig. 4, for greater clearness, whereas in Figs. 2 and 3 the extension or ajutage J is shown respectively by (a) the line of junction of the reflecting prism J and the line of heavy dots adjacent thereto, and (b) the double lines of heavy dots. The reflecting prism D when made of a separate piece of glass should be optically cemented to extension or ajutage J, and this extension or ajutage J, when made of a separate piece of glass, should be optically cemented to the adjacent portion of the compound prism block C, the reflecting prism D being of less depth than the compound prism block C so as to cause the reflecting surface E of the reflecting prism D to meet the extended portion J of the prism block C some distance from its front surface, i. e., that surface with aspect toward the scene.

In carrying out the construction according to Fig. 2, a condition which should be observed is that a light ray drawn through the point at which the reflecting surface of the reflecting prism meets the compound prism block and running parallel to the marginal ray of the entering cone of light rays on the side remote from the side lens shall not enter such side lens.

In this way the spread of the rays entering the side lens is allowed for so that with lenses of this focus and operating at this separation no hooding or a minimum of hooding; that is to say, cutting off of light at the front face of the compound prism block occurs.

When hooding is referred to it means that the cone of rays, which would otherwise enter the lens to form the image at the margins of the picture area, has a portion or portions of its outside rays cut off by the mounting or edge of the prism system. In other words hooding means that mutilation of the outside of the entering bundle of rays by the tube setting or circumscribing bounds which would occur if the reflecting system were opened or straightened out so as to form a direct course.

There may be cases where it is desirable to use lenses of this focus and aperture at a somewhat closer separation and under these circumstances some hooding or cutting off of light to the side lens must be permitted and the prism arrangement should preferably be constructed so that this hooding is equal on both sides of the picture. In these circumstances also it may be necessary to mask the front face or back face of the compound prism block slightly to prevent a secondary image being formed by directly transmitted light through the side lens.

A desirable apportioning of the light and control of the hooding effect may be realized by the arrangement shown in Fig. 3: the two reflecting surfaces in this case not being exactly at 45° to the axis of the incident cone of light rays, but being directed so as to come more nearly parallel to the front face of the prism block.

In the case illustrated by Fig. 3 the reflecting surfaces E and F must be strictly parallel to each other, although the angle of 45° is departed from as above stated so as to cause the reflected marginal ray from the front edge of the first reflecting surface F to the second reflecting surface E to substantially skim the front face of the compound prism block and the prism D need not be continued so as to form an angle at L. Further this form lends itself well to the simplification of forming the reflecting prism and the adjacent portion of the block of one piece of glass which carries both reflecting surfaces E and F.

All faces of the prism block not concerned in reflection or transmission should be ground and blackened with a paint the medium of which has a refractive index approximately equal to that of the glass.

What we claim is:—

1. A combined lens and prism system of the class described comprising a direct lens and a side lens, a partially transmitting and partially reflecting compound prism block in front of the direct lens, a reflecting prism at the side of the compound prism block in front of the side lens, the effective or reflection-transmission surface of said compound prism block being decentered relatively to the axis of the direct lens in a direction away from the axis of the side lens, and said compound prism block having a plain glass extension on that side of it giving toward, that is to say, having aspect toward the produced axis of the side lens into which extension the transmission reflection surface does not enter, said extension and said reflecting prism in front of the side lens being optically integral.

2. A combined lens and prism system of the class described comprising a direct lens and a side lens, a partially transmitting and partially reflecting compound prism block in front of the direct lens, a reflecting prism at the side of the compound prism block, the effective or reflection transmission surface of said compound prism block being decentered relatively to the axis of the direct lens in a direction away from the axis of the side lens, and said compound prism block having a plain glass extension on that side of it with aspect toward the produced axis of the side lens into which extension the transmission reflection surface does not enter, said extension and reflecting prism being optically integral, the coöperating reflecting surfaces of said compound prism block and its companion reflecting prism being retained parallel to each other but inclined at an angle greater than 45 degrees to the axes produced of the lenses, so as to cause the reflected marginal ray from the front edge of the first reflecting surface to substantially skim the front face of the compound prism block.

In testimony whereof, we affix our signatures.

FRANK TWYMAN.
HAROLD WORKMAN.

Copies of this patent may be obtained for five cents each, by addressing the "Commissioner of Patents, Washington, D. C."